(12) United States Patent
Biester

(10) Patent No.: US 8,485,499 B2
(45) Date of Patent: *Jul. 16, 2013

(54) DRIVE DEVICE

(75) Inventor: Klaus Biester, Weinhausen (DE)

(73) Assignee: Cameron International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,781

(22) Filed: Nov. 22, 2011

(65) Prior Publication Data

US 2012/0119125 A1 May 17, 2012

Related U.S. Application Data

(63) Continuation of application No. 10/564,586, filed as application No. PCT/EP2004/007949 on Jul. 16, 2004, now Pat. No. 8,074,966.

(30) Foreign Application Priority Data

Jul. 17, 2003 (DE) ............................. 203 11 032 U

(51) Int. Cl.
*F16K 31/50* (2006.01)

(52) U.S. Cl.
USPC ..................................... 251/249.5; 74/89.23

(58) Field of Classification Search
USPC ...... 251/248, 249.5, 250.5, 129.11; 74/89.23, 74/89.45
See application file for complete search history.

(56) References Cited

U.S. PATENT DOCUMENTS

| 4,465,091 A * | 8/1984 | Keller | 137/243.6 |
| 7,172,169 B2 * | 2/2007 | Biester | 251/129.11 |

* cited by examiner

*Primary Examiner* — John Bastianelli
(74) *Attorney, Agent, or Firm* — Chamberlain Hrdlicka

(57) ABSTRACT

A driving device for adjusting an activating element of a throttle, of a valve, of a connecting device, of a metering device or the like in particular in the field of oil and gas exploration with at least one rotary gear movably connected to the activating element and a gear arranged between the rotary gear and at least one motor. To improve such a drive device in that the structure is simple and compact and efficiency is increased wherein simultaneously high axial forces are avoided and only a small number of assembly parts are necessary, the gear unit comprises a reduction gear assigned to the rotary gear in particular the so called harmonic drive gear, and a spare gear assigned to the motor which is in particular self locking.

24 Claims, 6 Drawing Sheets

DRIVE DEVICE

CROSS-REFERENCE TO RELATED APPLICATIONS

The present application is a continuation application of and claims priority under 35 U.S.C. §120 to U.S. patent application Ser. No. 10/564,586 (US 2006/0163507) filed 13 Jan. 2006 now U.S. Pat. No. 8,074,966, which claims priority to PCT/EP2004/007949 filed 16 Jul. 2004 and to German Application No. 203 11 032.3 filed 17 Jul. 2003, all of which are incorporated herein by reference in their entirety for all purposes.

STATEMENT REGARDING FEDERALLY SPONSORED RESEARCH OR DEVELOPMENT

Not applicable.

BACKGROUND OF THE INVENTION

The invention relates to a drive device for the adjustment of an actuating element of a throttle, valve, connecting device (coiled connector) or a dosage feed device or similar item of equipment, in particular in the mining of mineral oil or natural gas, with at least one spindle drive movably connected to the actuating element and a gear unit arranged between the spindle drive and at least one motor.

Such a drive device is known from DE 200 18 561. The prior device is used for the adjustment of a shut-off element as actuating element in a blow-out valve arrangement (blow-out preventer, BOP), whereby a connecting channel in the BOP can be closed by the shut-off element. The shut-off element is movably connected to the spindle drive. Through this spindle drive a rotational movement produced by the motor is converted into a linear movement for the adjustment of the actuating element. In addition, a worm gear is arranged as a further gear unit between the motor and the spindle drive.

This drive device and especially due to the application of the worm gear is characterised characterised by a self-locking mechanism and also otherwise can be well employed for the adjustment of various actuating elements. Such a drive device exhibits substantial advantages over other devices without worm gear. However, generally the efficiency is restricted to less than 50% and also the self-locking mechanism is only produced at a high transmission ratio. In addition, relatively high axial forces sometimes occur with worm gears.

SUMMARY OF THE PREFERRED EMBODIMENTS

The object of the invention is to improve a drive device of the type mentioned at the beginning such that with a simple and compact construction an increase in the efficiency for reduction of the dissipated losses is possible, at the same time especially avoiding high axial forces and needing only a low number of components.

This object is solved by the features of Claim 1.

Through the application of an especially self-locking spur gear as part of the gear unit a very compact construction is produced and also the efficiency is increased to over 50% through the use of such a spur gear. In addition, at least only reduced axial forces occur due to the appropriate arrangement of the spur gear.

The spur gear here in this respect is assigned to the motor and is appropriately movably connected to it, whereby the gear unit furthermore exhibits a reduction gear which is assigned to the spindle drive and is movably connected to it. One such reduction gear is especially a so-called harmonic drive. Due to this further reduction gear the rotational speed of the motor can be reduced so far in a simple manner that even extremely slight adjustments to the corresponding actuating element are possible and accurately controllable. Due to the arrangement of spindle drive, reduction gear, spur gear and motor, a short, compact construction is also produced, requiring little space.

To obtain a spindle drive which features high loadability with a long service life and simultaneously very good mechanical properties, such a spindle drive can be a roller or ball screw drive with spindle nut and threaded spindle. In particular a suitable roller screw drive can be regarded as advantageous when applied in the mining of mineral oil or natural gas at inaccessible places, because it operates essentially free of maintenance.

Depending on the actuating element, its adjustment by different parts of the spindle drive spindle drive is of advantage. For example, the spindle nut can be supported rotationally, but axially immovable in the device housing. In this way the threaded spindle is moved accordingly in an axial or linear direction when the spindle nut rotates and can consequently with an appropriate connection to the actuating element also move the actuating element linearly. It is also possible to support the spindle nut rotationally rigidly, but axially movable in the device housing. In this respect the threaded spindle can rotate, but is arranged axially immovable. Through the appropriate coupling of the spindle nut and the actuating element, the movement of the spindle nut is then transferred to the actuating element.

A simple assignment of spindle drive and reduction gear can be seen when the spindle nut or threaded spindle is rotationally rigidly joined to the reduction gear. Accordingly, the rotation of the reduction gear on its output side is transferred to the spindle nut or threaded spindle. This can also occur by an essentially direct connection to the spindle nut or to the threaded spindle from the side of the reduction gear.

If the reduction gear is a so-called harmonic drive, it generally exhibits three components. The first component is a flexible, cup-shaped toothed sleeve. The second component is a fixed ring element and the third a wave generator. The toothed sleeve is in partial engagement with its outer teeth engaging suitable inner teeth on the ring element. The wave generator is arranged inside the toothed sleeve and through its rotation the flexible toothed sleeve is extended so far at two opposite points that its outer teeth engage the inner teeth of the ring element. Generally, the toothed sleeve exhibits two teeth less than the ring element so that with one rotation the relative movement between the toothed sleeve and the ring element amounts to two teeth. Such a harmonic drive is capable of extreme loads and requires little maintenance.

The transfer of the rotational movement of the harmonic drive to the spindle drive can for example occur in that the toothed sleeve is rotationally rigidly joined to the spindle nut or the threaded spindle.

There is the possibility of directly connecting the toothed sleeve and an appropriate part of the spindle drive. However, to design the drive device in a more variable manner and where applicable to construct it in a modular way, a rotationally supported but axially immovable connecting sleeve can be arranged between the toothed sleeve and the spindle drive. This connecting sleeve can be used at one end for the connection to the spindle nut or to the threaded spindle and at the other end for connection to the toothed sleeve.

In order to obtain a secure connection between the threaded spindle and the toothed sleeve or connecting sleeve, the threaded spindle can be rotationally rigidly inserted with one drive end in a retention hole of the connecting sleeve. Various possibilities are conceivable to fix the drive end in the retention hole. One possibility, which also permits the transfer of large forces, is the formation of splines between the threaded spindle and the inner side of the retention hole.

With a simple embodiment the spur gear can be helically toothed.

In order to retain the advantages of the spur gear, such as high efficiency, low reduction, simple construction, parallel axes, etc. and to also simply realise the self-locking or self-braking, the spur gear is formed as a double helical gear. Such a double helical gear exhibits double helical teeth and an approximate screw-shaped appearance. The self-braking effect can be varied depending on the helix angle of the double helical gear and its various helical gears. This applies analogously to the self-braking, whereby self-braking is in principle regarded as being on the drive side and self-locking on the driven side and with appropriate direction of rotation. Particularly, for devices in the mining of mineral oil and natural gas such self-braking and self-locking gears are of advantage, because separate holding/braking devices can be omitted.

Such helically toothed spur gears or also double helical gears feature small dimensions, a long service life, high reliability in operation and stable transmission. Furthermore, due to the parallel arrangement of the individual helical gears, a compact construction is produced. The gears can be easily adapted to different application conditions and also feature low noise levels.

An appropriate spur gear exhibits at least two helical gear wheels. According to the invention, the reduction gear and in particular its wave generator can be movably connected to a first spiral toothed gear wheel and the motor to a second spiral toothed gear wheel of the spur gear. It is again pointed out that efficiency for such spur gears and in particular for double helical gears is greater than 65% and can even amount to 80% or more. In addition, with such gears a linear contact of the tooth faces arises instead of a point contact as with a worm gear.

In order to transfer the drive power of the motor on the shortest and easiest path into the spur gear, the second spiral toothed gear wheel can be arranged on a drive shaft of the motor.

In order to construct the drive device redundantly or to design it also for higher powers, two or more motors can be assigned to the drive shaft. Here, there is the possibility that generally the actuating element can be adjusted by the operation of only one motor, so that the other motor or motors are only employed when that one motor fails. Similarly, there is the possibility of attaining an appropriate drive power through the application of a large number of relatively small motors.

There is also the possibility that two or more drive shafts each with at least one motor are supported essentially parallel to the threaded spindle in the device housing. This also provides redundancy or an increase in the power of the drive device. Of course, here two or more motors on each of the drive shafts are also possible. If motors on different drive shafts are employed simultaneously, then they are synchronised, whereby the synchronisation can occur electronically as well as mechanically, for example, directly between the drive shafts. Preferably two drive shafts can be arranged diametrically opposed in the device housing. However, arrangements are also possible in which the drive shafts are arranged offset from one another by certain angles in the circumferential direction of the device housing. Examples of such angles are 45°, 90°, 270° and also other intermediate values between 0° and 360°. This applies analogously to the arrangement of more than two drive shafts.

In order to connect each of the drive shafts directly to the spur gear, a second spiral toothed gear wheel, which engages the first spiral toothed gear wheel of the spur gear, can be arranged on each drive shaft.

In order to design a drive device independently of complicated feeds for compressed air or any other pressure medium, the motor can be an electric motor. Consequently, there is the possibility of electrifying the complete drive device as well as its control and monitoring system. One example of such an electric motor is a servomotor or an asynchronous motor.

With regard to the spur gear there is, of course, also the possibility that the various second spiral toothed gear wheels engage in each case different first spiral toothed gear wheels, whereby these first spiral toothed gear wheels, for example, can all be appropriately connected to the spindle drive. It has already been pointed out that the teeth of the spur gear can be so-called helical teeth, exhibiting a certain helix angle. Due to the helical orientation of the teeth, there is the possibility of reducing the normal number of teeth significantly. According to the invention, a helix angle for example of the first and/or the second spiral toothed gear wheel can be in the range from 50° to about 90° and particularly in the range from 65° to 85°. With an appropriately high helix angle the number of teeth can be reduced to one.

In contrast, in particular, to a worm gear in which self-locking is only provided for transmission ratios down to a certain smallest transmission ratio, with a spur gear transmission ratios lower than 25 and lower than 1 can be realised without having to dispense with a self-locking or self-braking mechanism. For the simple construction of the spur gear the first and second spiral toothed gear wheels exhibit 1 to 10, preferably 1 to 7 and especially preferred 1 to 4 teeth, whereby reduction ratios in the range 1 to 5 up to 1 to 100 on the drive device according to the invention are generally sought.

In order to proceed further with the modular construction of the drive device according to the invention and at the same time to be able to simply fit and remove certain parts, the connecting sleeve can be releasably connected at its end facing away from the spindle drive to the toothed sleeve.

When the spindle nut is the axially movable part of the spindle drive, there is the possibility of coupling the actuating element directly to the threaded nut, so that the actuating element can also be moved linearly. Another possibility is to provide another gear, which converts the linear movement of the spindle nut into a rotational movement, between the actuating element and the spindle nut. This can occur, for example, in a simple manner in that at least one engaging element protrudes from the threaded spindle or the spindle nut essentially radially outwards and engages in slots of a fixed sleeve and a rotating sleeve, whereby a first slot extends essentially in the axial direction and a second slot extends at an acute angle to the first slot. If, for example, the first slot is in the fixed sleeve, the rotating sleeve rotates when the corresponding part of the spindle drive is moved in the axial direction by the appropriate engagement of the engaging element in both slots. In this way the conversion of the linear movement into the rotational movement is determined by the slope of the corresponding second slot in the rotating sleeve. Here it is possible, for example, that the corresponding alignment of the slots changes so that in a first slot section only a slight rotation of the rotating sleeve occurs relative to the fixed sleeve. Consequently, an extremely fine rotation of the actuating element is possible, as is for example of advantage for throttles and the corresponding throttle elements. Once the throttle has then opened partially, the angle between the two slots can increase quickly so that the throttle is then completely opened very quickly. Further possibilities of the orientation of the two slots relative to one another are obvious.

As already stated, it can be favourable in this respect if the actuating element can be rotated together with the rotating sleeve.

There are various possibilities of monitoring the movement of the actuating element and of applying the monitored movement for the control of the drive device and therefore of the actuating element. With one embodiment a position sensor can be assigned to the axially movable part of the spindle drive. Of course, assignment of a position sensor and a rotating part of the spindle drive are also possible. In addition, an appropriate position sensor can also be assigned to another part of the drive device, from the movement of which the displacement of the actuating element can be determined.

In order to be able to accommodate a suitable position sensor in the device housing without this position sensor being disturbed by the other parts of the drive device, the position sensor can exhibit an essentially flat code carrier which is offset radially outwards with respect to the threaded spindle and arranged parallel to it. The code carrier also moves in the axial direction corresponding to the movement of the threaded spindle or spindle nut, so that this axial movement is directly acquired and the corresponding conclusions about the displacement of the actuating element can be drawn from it.

With a simple embodiment a dog can be arranged between the axially moving part of the spindle drive, in particular the engaging element and the code carrier. As previously explained, the engaging element is used for engaging the pair of slots so that with appropriate movement of the code carrier, conclusions can be drawn about the rotation of the rotating sleeve and therefore also about the displacement of the actuating element.

At this point it should be noted that such a code carrier of the position sensor can exhibit an appropriate position-specific pattern which passes by an appropriate scanning device of the position sensor when the code carrier moves. Through this passage of the pattern, accurate conclusions can be drawn about the displacement of the code carrier and therefore about the movement of the corresponding part of the spindle drive or of the actuating element.

For the further preferred design of the drive device and for increasing its variability a distance sleeve can be arranged in a motor hole of the device housing on a side, facing away from the second spiral toothed gear wheel, of the at least one motor. This distance sleeve can be removed where applicable to accommodate a second, third or more motors in the corresponding motor hole. Furthermore, the distance sleeve can also be used as further support for the drive shaft.

In order to adapt as applicable and, with regard to the motorization, to vary the drive device in a simple way to various circumstances and possibly also to various actuating elements, the device housing can be of modular construction. In this way there is the possibility that, for example, the gear unit, spindle drive and motors are accommodated in one part of the device housing, whereas in another part the actuating element is arranged. It may also be conceived as favourable that only the connecting sleeve, gear unit and motors are arranged in one housing part, whereas the spindle drive is arranged in another part of the housing and the actuating element is arranged in a further housing part. Of course, each of the housing parts exhibits an appropriate opening for the connection of the particularly moving devices arranged in each of the housing parts.

In addition, the device housing can be provided with various, diagonally running surfaces on its outer side which enable easy insertion by remote control of the complete drive device in, for example, a so-called tree on the sea bed.

Furthermore, due to the modular construction of the device housing, easy disassembly is provided, for example, to replace or maintain parts.

With the sideward parallel offset code carrier, in order to guide it in a simple manner within the device housing, the code carrier can be guided in a guide sleeve in the axial direction.

It is conceivable that with an embodiment of the drive device according to the invention the threaded spindle and the spindle nut are rotationally supported together in the device housing, but are axially immovable. In this way, for example, the rotation of the threaded spindle is converted directly into a rotation of the actuating element. The threaded nut is used in this connection as a support for the threaded spindle without it being axially displaced. Essentially here, only a corresponding rotation of the threaded nut occurs synchronously to the threaded spindle.

There is the possibility of displacing a valve element for more or less closing or opening the valve directly with a corresponding end of the threaded spindle. In this case however the modular character of the drive device is restricted, because the corresponding end of the threaded spindle is matched to the special valve element or similar component. It would be more convenient if the threaded spindle was releasably connected at its end facing away from the spindle nut to a sliding rod of the actuating element. In this way the sliding rod can be formed in the same way, also for different devices, only at its end facing the threaded spindle. Consequently, sliding rods assigned to different actuating elements can be connected to a threaded spindle with the same construction in each case.

If there is adequate space available and in particular when the threaded spindle is axially movable, the code carrier of the position sensor can at least be inserted with one end section into an inner hole of the threaded spindle and be releasably connected there for common movement of the code carrier and threaded spindle in the axial direction. In this respect the code carrier is accordingly also brought out through the following connecting sleeve, reduction gear and the spur gear so that an appropriate scanning of the code carrier only takes place outside of the gear unit. Consequently, the corresponding position sensor is easier to contact electrically and, where applicable, easier to replace.

There is also the possibility that the spindle nut and connecting sleeve are connected together releasably. In this way the rotation of the connecting sleeve is directly transferred to the spindle nut, whereby the spindle nut is here immovable in the axial direction due to the corresponding support of the connecting sleeve.

BRIEF DESCRIPTION OF THE DRAWINGS

Advantageous embodiments of the invention are explained in more detail in the following based on the figures enclosed in the drawings.

The following are shown.

DETAILED DESCRIPTION OF THE PREFERRED EMBODIMENTS

Figure 1:
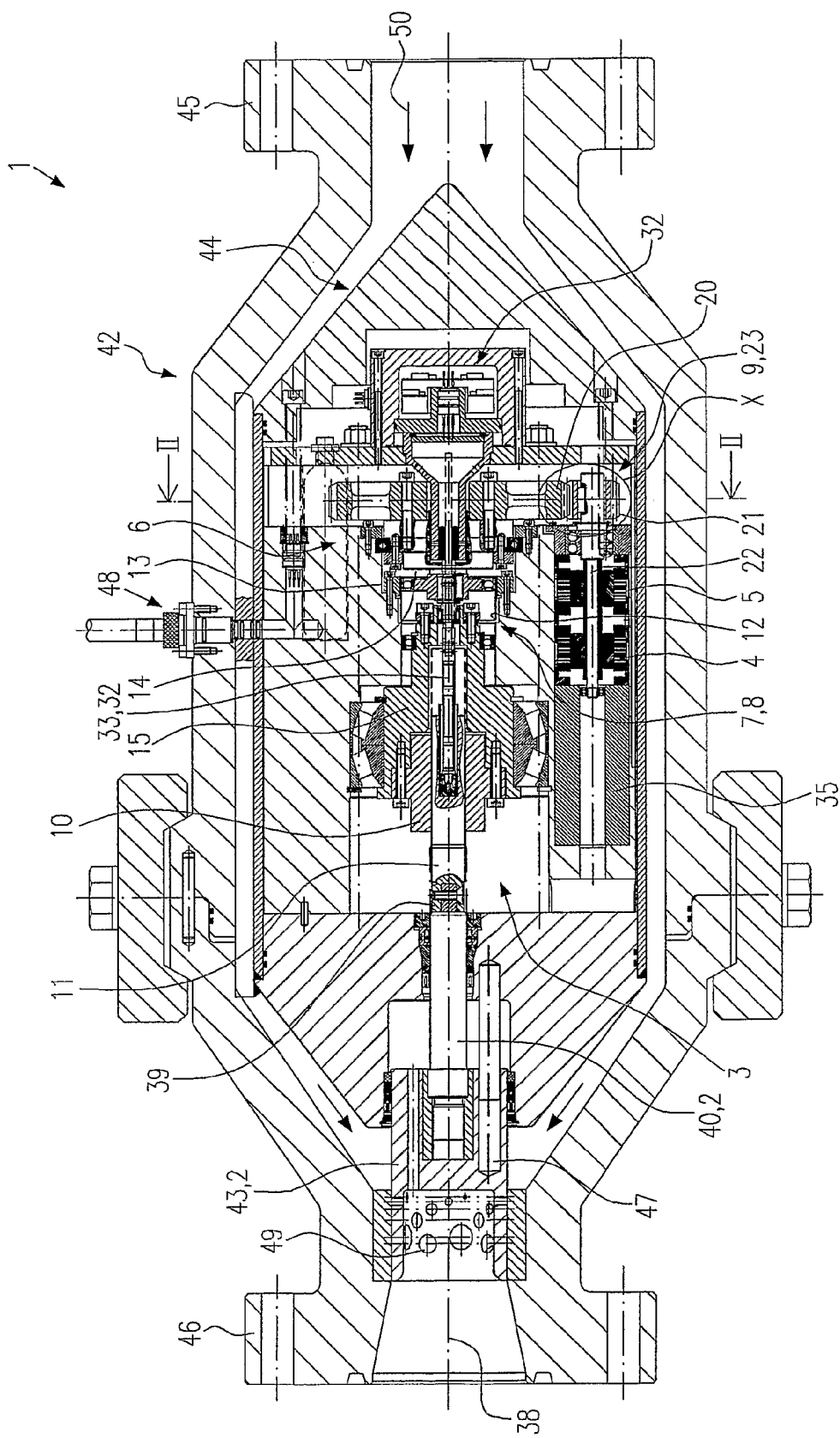
FIG. 1 a longitudinal section through a first embodiment of a drive device.

With all embodiments according to the invention, the same reference symbols refer in each case to the same parts and are sometimes only discussed in connection with one of the figures. In part, reference symbols used in one or some of the figures are omitted in the other figures for reasons of clarity.

In all embodiments the arrangement of the various parts of the drive device 1 is common. These parts comprise in particular an appropriate actuating element 2 for the corresponding device, such as valve, throttle, dosage feed device or similar equipment, which are particularly employed in the mining of mineral oil and natural gas. Apart from the actuating element 2 which is formed differently according to the device, each drive device 1 exhibits a spindle drive 3, a gear unit 6 movably connected to it and consisting of a reduction gear 7 and spur gear 9 as well as the motor or motors 4, 5 driving the spur gear.

With the embodiment according to FIG. 1, the actuating element 2 exhibits a sliding rod 40 which is connected at one of its ends to a holed sleeve 43. At the free end of the holed sleeve 43 a number of holes 49 are formed in the sleeve, through which depending on the position of the holed sleeve 43 in the axial direction 38 more or less fluid flows from the inlet end 45 to the outlet end 46 according to the fluid flow 50. In the illustrated position of the holed sleeve 43 all the holes 49 are closed so that no flow occurs through the outlet end 46.

To prevent the holed sleeve 43 from rotating, it is rotationally rigidly connected to a circulation body 44 by means of a keyed shaft 47. The circulation body is arranged in the device housing 42. The various parts of the drive device 1, such as the spindle drive 3, gear unit 6 and motors 4, 5, are arranged inside the circulation body 44.

The spindle drive 3 is formed as a recirculating roller spindle drive with an appropriate threaded spindle 11 and spindle nut 10. The threaded spindle 11 is connected with its end 39 pointing away from the spindle nut 10 to the sliding rod 40.

The spindle nut 10 is releasably attached to a connecting sleeve 15 by means of a number of threaded bolts, whereby the spindle nut 10 can rotate by means of a suitable rotational support of the connecting sleeve 15, but is immovable in the axial direction.

Figure 4:
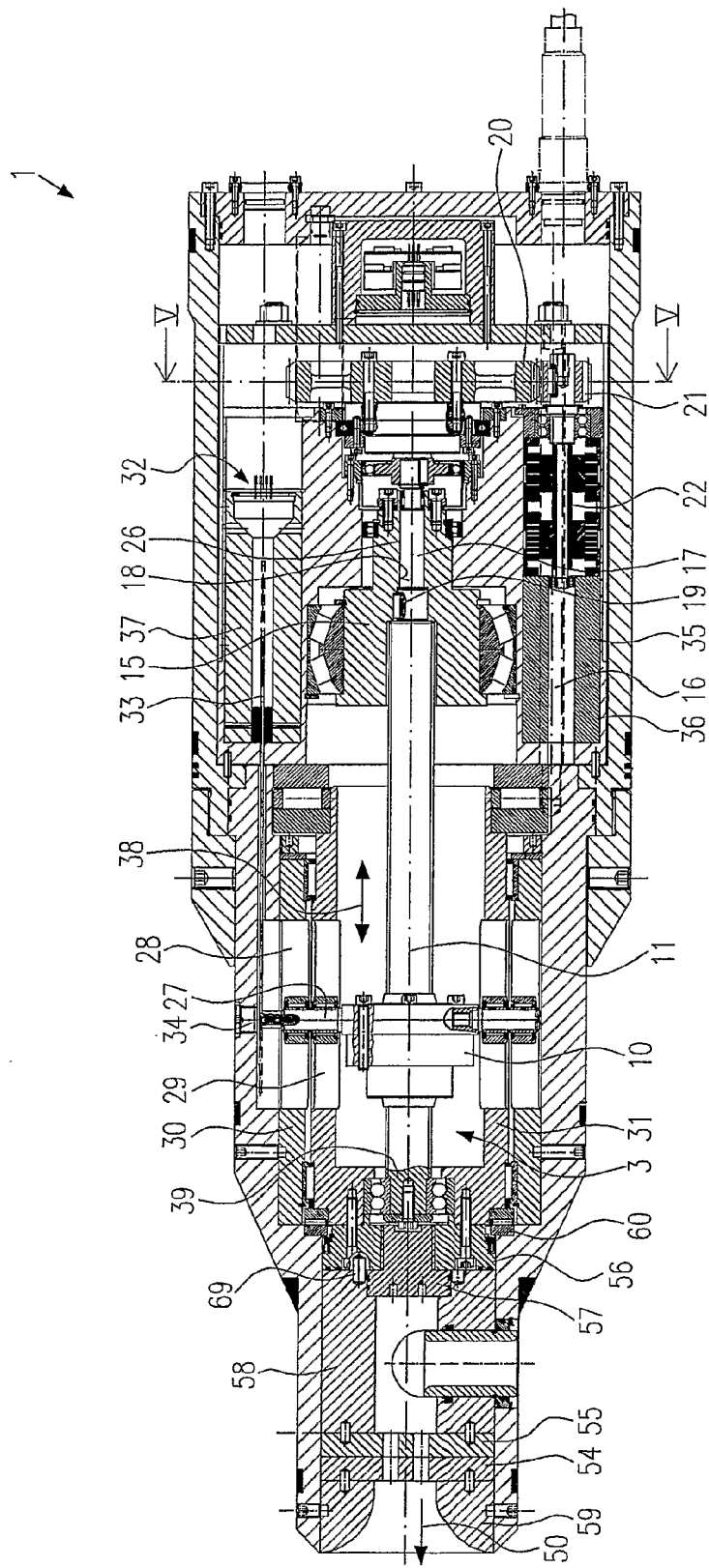
FIG. 4 a longitudinal section through a second embodiment of a drive device according to the invention.

The connecting sleeve 15 exhibits a retention hole 17, refer also to FIG. 4, in which the spindle nut 10 is partially inserted. In this retention hole 17 the threaded spindle 11 is also inserted depending on the axial displacement, whereby its drive end 16 located in the retention hole 17 is provided with an internal hole in which a code carrier 33 of a position sensor 32 is inserted. The code carrier 33 can be moved in the axial direction 38 together with the threaded spindle 11.

A reduction gear 7 is connected as part of the gear unit 6 for the rotation of the connecting sleeve 15 to an end of the connecting sleeve 15 pointing away from the spindle nut 10. The reduction gear 7 is formed as a so-called harmonic drive 8. This exhibits a flexible toothed sleeve 12 which is at its closed end rotationally rigidly connected to the connecting sleeve 15. The toothed sleeve 12 exhibits at its open end outer teeth which partially engage inner teeth of a fixed ring element 13 as another part of the harmonic drive 8. Inside the toothed sleeve 12 a wave generator 14 is also arranged as part of the harmonic drive 8 in the region of the ring element 13.

The harmonic drive 8 operates in a known manner in that the flexible toothed sleeve 12 is extended at two opposite points by the wave generator 14 such that its outer teeth engage the inner teeth of the ring element 13. Generally, the toothed sleeve exhibits two teeth less than the ring element so that for one rotation the relative movement between the toothed sleeve and the ring element amounts to two teeth. The corresponding wave generator 14 is according to the invention rotationally rigidly connected to a first spiral toothed gear wheel 20 of a spur gear 9 as another part of the gear unit 6. The first spiral toothed gear wheel 20 engages at least a second spiral toothed gear wheel 21, whereby in a further embodiment the corresponding helical teeth 24, refer also to FIG. 3, of the spiral toothed gear wheels 20, 21 can be formed such that a double helical gear 23 is produced. Such a helically toothed spur gear 9 is self-braking and self-locking. The helical teeth of the various spiral toothed gear wheels are formed by appropriate teeth which are arranged at an appropriate helix angle 25, again refer to FIG. 3.

For the first and/or second spiral toothed gear wheel the helix angle is 50° to approximately 90° and preferably 65° to 85°. Due to the spur gear a transmission ratio in the range between i=25 and i<1 is produced. Accordingly, the spiral toothed gear wheels exhibit 1 to 10, preferably 1 to 7 and especially preferred 1 to 4 teeth.

With the embodiments according to the figures, a second spiral toothed gear wheel 21 in each case externally engages the first spiral toothed gear wheel 20. Of course two, three or more second spiral toothed gear wheels 21 can be arranged along the circumference of the first spiral toothed gear wheel 20 and can engage the first spiral toothed gear wheel 20.

With the embodiment according to FIG. 1 the second spiral toothed gear wheel 21 is arranged on a drive shaft 22 which is offset radially outwards and extends parallel to the threaded spindle 11. Transfer of the drive force from two electric motors 4, 5 occurs on the drive shaft 22.

There is the possibility that according to the arrangement of further second spiral toothed gear wheels also further drive shafts 22 can be accordingly arranged with motors 4, 5. These are then analogously distributed along the circumference of the first spiral toothed gear wheel 20, whereby the corresponding drive shafts 22 are in each case arranged parallel to one another.

With the embodiment according to the invention of the drive device 1 the drive shaft 22 extends with its end facing away from the second spiral toothed gear wheel 21 to a distance sleeve 35, whereby an appropriate end of the drive shaft 22 is rotationally supported in the distance sleeve 35. There is the possibility of omitting this distance sleeve 35, in that for example the drive shaft 22 is extended and is provided with further motors 4, 5 in the region of the distance sleeve 35.

The code carrier 33 of the position sensor 32 is passed through the first spiral toothed gear wheel 20 and the reduction gear 7. The code carrier is inserted, with its end facing the threaded spindle 11, in the same and fixed there. The code carrier 33 exhibits a position-specific pattern on its outer side, the said pattern being able to be scanned by a suitable scanning or sensor device of the position sensor 32. This scanning produces an exact position determination of the code carrier 33 with displacement in the axial direction 38, the said position displacement being convertible into a corresponding position displacement of the threaded spindle 11, the sliding rod 40 and therefore the holed sleeve 43. Consequently, the relevant position of the holed sleeve 43 and accordingly the arrangement of the holes 49 can be determined by the position sensor 32, whereby the corresponding throttling of the actuating element 2 is determined with regard to the fluid flow 50.

For the electrical supply of both the motors 4, 5 and the position sensor 32 an electrical connection device 52 in the form of an electrical connector 48 is brought externally to the device housing 42 and attached there. The appropriate electrical supply cables are routed into the interior of the drive device 1 where they are connected to the appropriate units.

It is again pointed out that the corresponding parts of the drive device 1—refer to the actuating element 2, spindle drive 3, motors 4, 5 and gear unit 6—are essentially similarly constructed and combined for all embodiments of the drive device. With the following embodiments only the differences to the embodiment according to FIG. 1 are explained.

Figure 2:
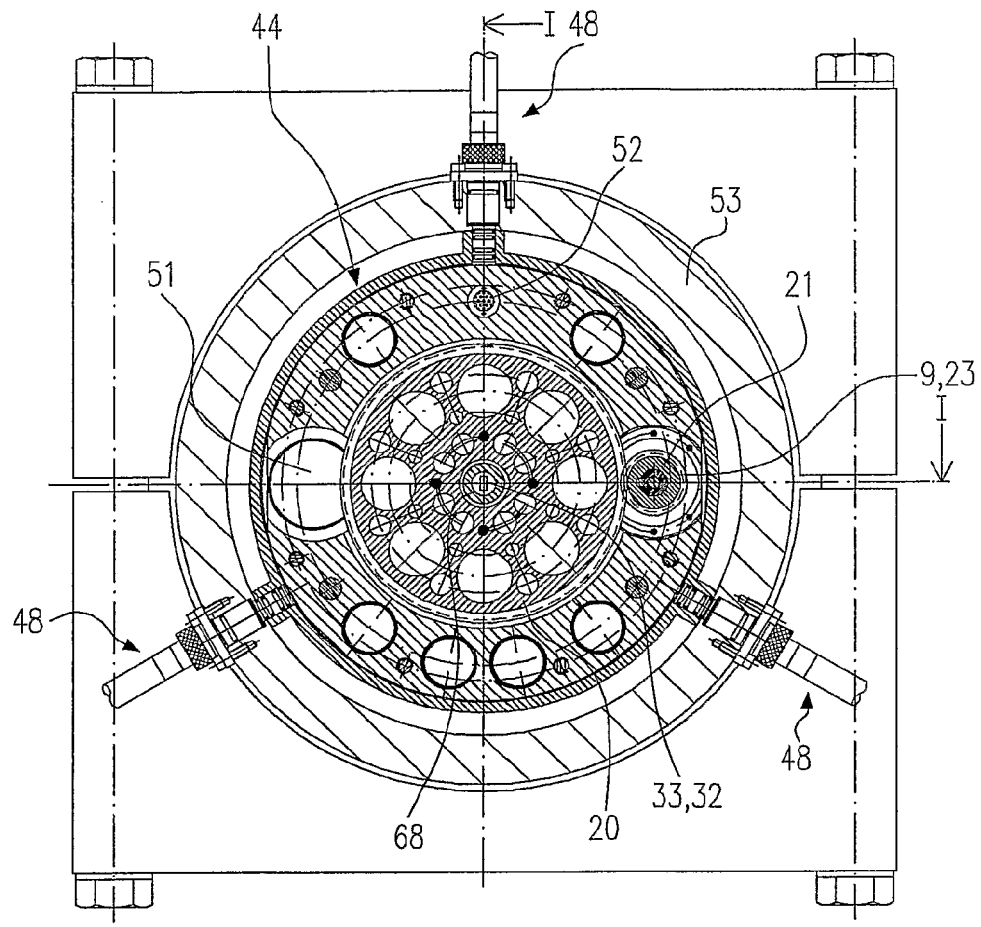
FIG. 2 a section along the line II-II in FIG. 1.

In FIG. 2 a section along the line II-II from FIG. 1 is illustrated, whereby FIG. 1 corresponds to an appropriate section along the line I-I in FIG. 2.

The circulation body 44 is circular shaped in cross-section, whereby the corresponding electrical connection devices or electrical connectors 48 are arranged at three equally spaced points in the circumferential direction. Centrally in the circulation body 44 the first spiral toothed gear wheel 20 is arranged which engages the second spiral toothed gear wheel 21. Centrally in the first spiral toothed gear wheel 20 a sleeve-shaped end 68 of the position sensor 32 is inserted, refer also to FIG. 1, whereby the code carrier 33 is located inside this sleeve-shaped end 68.

Opposite the second spiral toothed gear wheel 21 an empty cavity 51 is arranged which can be used for the accommodation of a further second spiral toothed gear wheel 21 with appropriate drive shaft 22 and motors 4, 5 and, where applicable, distance sleeve 35. Further such empty cavities can be arranged at other points in the circumferential direction of the first spiral toothed gear wheel 20.

Figure 3:
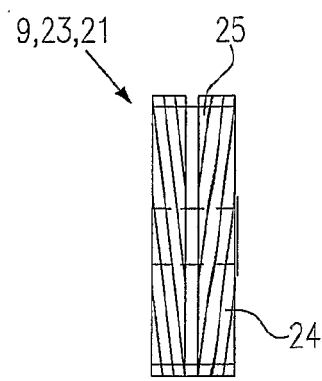
FIG. 3 an enlarged view of a detail "X" in FIG. 1.

In FIG. 3 an enlarged illustration of the detail "X" from FIG. 1 is shown, whereby this illustration corresponds to a side view from the radial direction of the second spiral toothed gear wheel 21. This exhibits double arranged helical teeth 24 so that a double helical gear 23 is formed. An appropriate helix angle 25 for the helical teeth is between 50° and about 90° and preferably between 65° and 85°.

Analogously to the second spiral toothed gear wheel 21, the first spiral toothed gear wheel 20 is formed with such a double helical tooth arrangement. There is also the possibility of only using one helical tooth arrangement.

FIG. 4 illustrates a section in the axial direction through a second embodiment of a drive device 1.

The arrangement of the gear unit 6 and the motors 4, 5 corresponds to that of FIG. 1, refer to the explanations there.

A difference to the embodiment according to FIG. 1 is that the threaded spindle 11 is rotationally rigidly connected as part of the spindle drive 3 to the connecting sleeve 15 by means of splines 19, but is fixed in the axial direction 38. Accordingly, the drive end 16 of the threaded spindle 11 is inserted into the retention hole 17 of the connecting sleeve 15 and held rotationally rigidly on its inner side 18 by means of the splines 19.

Along the threaded spindle 11, the spindle nut 10 can be moved in the axial direction, whereby it is however arranged rotationally rigidly. The rotational rigidity is produced especially in that engaging elements 27 protrude radially outwards from the spindle nut 10, the engaging elements engaging in diametrically opposite slots 28 of a fixed sleeve 30. The slots 28 extend in the axial direction 38 and ensure the rotational rigidity of the spindle nut 10 due to the guidance of the engaging elements 27. The appropriate engaging element 27 does not only engage the slot 28 of the fixed sleeve 30, but also appropriate slots 29 of a rotating sleeve 31. The slots 29 of the rotating sleeve 31 run diagonally to the slots 28 of the fixed sleeve 30. In this respect the diagonal orientation in the longitudinal direction of the slots can vary so that for example first only a slight angle is present between the slots 28, 29 so that only a slight relative rotation between the rotating sleeve 31 and the fixed sleeve 30 is produced even with a longer displacement of the spindle nut 10 in the axial direction 38. Following that, the angle can enlarge so that then also with just a slight movement of the spindle nut 10, a comparatively substantially large relative rotation between the rotating sleeve 31 and the fixed sleeve 30 occurs. Of course, different conversions of the appropriate axial movements of the spindle nut 10 into a rotational movement of the rotating sleeve 31 relative to the fixed sleeve 30 are possible by means of appropriate orientation of the slots 28, 29 relative to one another.

The rotation of the rotating sleeve 31 is transferred by means of its attachment with appropriate threaded bolts to an intermediate ring 26. This ring is connected rotationally rigidly by means of inserted pins to a rotary coupling sleeve 58 which in turn is rotationally rigidly connected to a first perforated screen 55 by means of appropriate inserted pins. By rotating the first perforated screen 55 relative to a second, stationary perforated screen 54, an aperture opening of varying size is produced by the overlapping of appropriate openings in both perforated screens 54, 55. If the corresponding openings do not overlap, then no flow occurs through the perforated screen arrangement in the direction of flow 50.

For determining the position of the spindle nut 10 and therefore also for the monitoring of the rotation of the first perforated screen 55, the engaging element 27 exhibits at least on one side of the spindle nut 10 a dog 34 which protrudes further radially outwards. This dog 34 is connected to an essentially flat and rod-shaped code carrier 33. Corresponding to FIG. 1, this forms part of a position sensor 32. Differing from the embodiment according to FIG. 1, the position sensor 32 and code carrier 33 are offset radially outwards and arranged parallel to the threaded spindle 11. Through the associated movement of the code carrier 33 with spindle nut 10, an accurate position determination of the spindle nut 10 is provided by appropriate scanning of a position-specific pattern arranged on the code carrier. The position of the spindle nut 10 can be converted into an accurate rotated position of the first perforated screen 55 relative to the second perforated screen 54.

Analogously as with the embodiment according to FIG. 1, the spindle drive 3 according to FIG. 4 is a recirculating roller spindle drive and the spur gear 9 can be formed as a double helical gear 23. Similarly analogously to the first embodiment, there is the possibility of arranging several drive shafts 22 with corresponding drive motors 4, 5 and assigned second spiral toothed gear wheels 21 in the circumferential direction of the first spiral toothed gear wheel 20.

Figure 5:
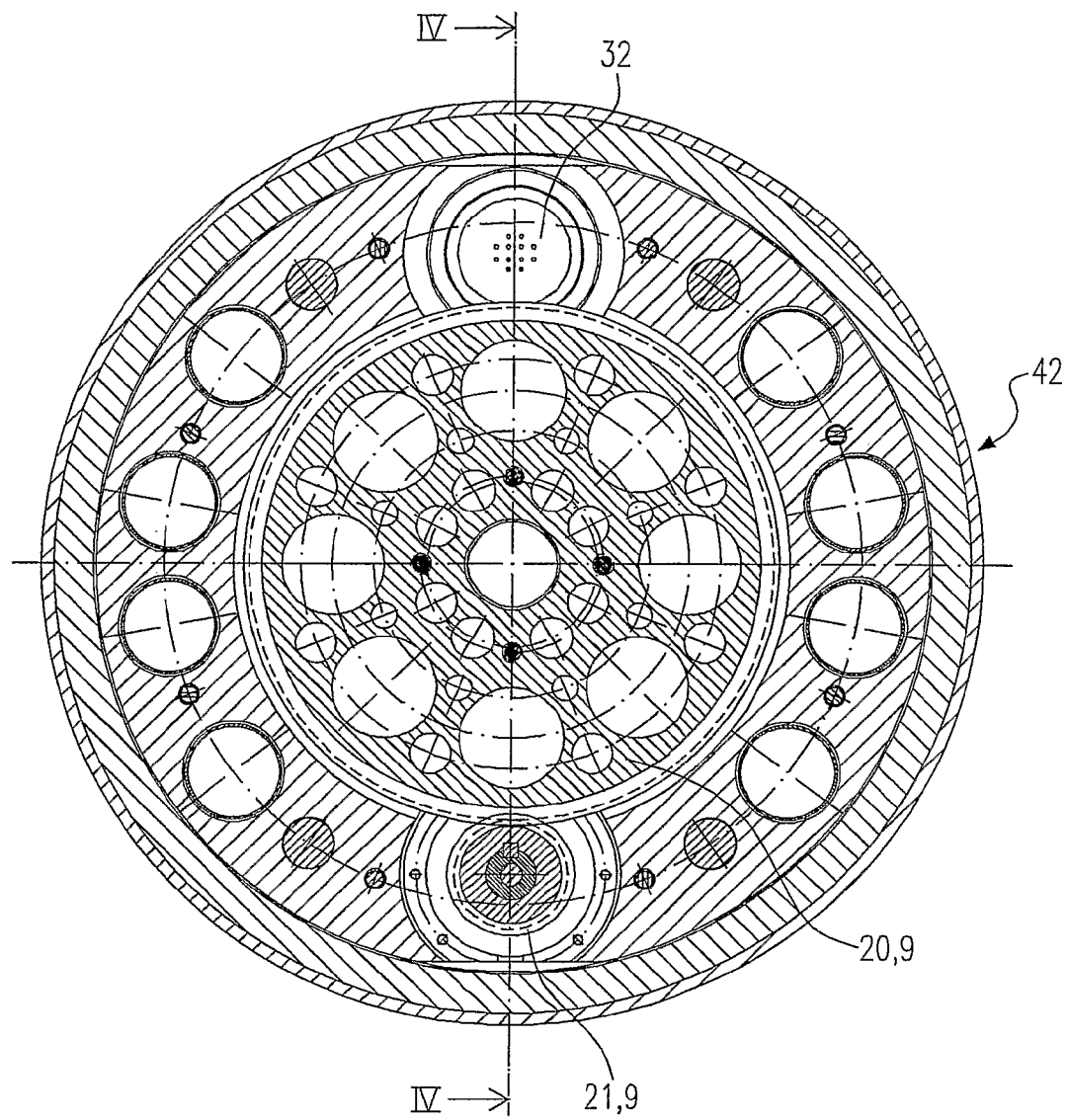
FIG. 5 a section along the line V-V in FIG. 4.

FIG. 5 corresponds to a section along the line V-V from FIG. 4, whereby FIG. 4 corresponds to a section along the line IV-IV according to FIG. 5.

Essentially FIG. 5 corresponds to FIG. 2, whereby however the second spiral toothed gear wheel 21 is not arranged to the side of the first spiral toothed gear wheel 20, refer to FIG. 2, but instead below it. The position sensor 32 is arranged diametrically opposed. There is the possibility of arranging further appropriate empty cavities 51, refer to FIG. 2, along the circumferential direction of the first spiral toothed gear wheel 20 for the accommodation of further drive shafts 22 and corresponding second spiral toothed gear wheels 21.

Inside the first spiral toothed gear wheel 20 there is in accordance with the other arrangement of the position sensor 32 with the code carrier 33 no such code carrier 33 arranged, refer here instead to FIG. 2.

Figure 6:
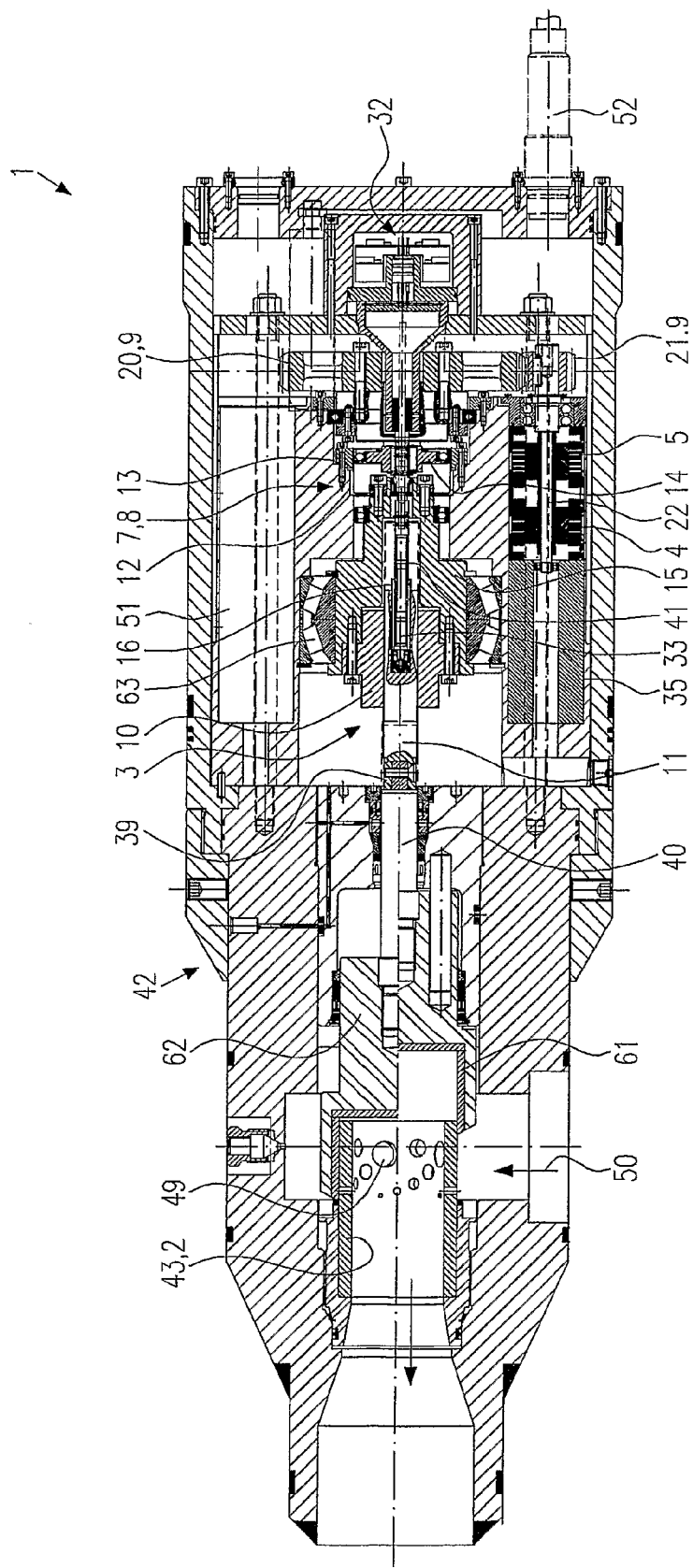
FIG. 6 a longitudinal section through a third embodiment of the drive device according to the invention, and FIG. 7 a longitudinal section through another embodiment of the drive device according to the invention.

FIG. 6 shows another embodiment of a drive device 1 according to the invention, which is essentially constructed analogously to the drive device 1 according to FIG. 1. The differences essentially relate to the other application of the drive device 1, i.e. the combination with another actuating element 2, whereby similarly the corresponding parts of the drive device 1 are not integrated in a circulation body 44 according to FIG. 1.

Instead the actuating element according to FIG. 6 exhibits a sliding rod 14 which is rotationally rigidly connected at its end facing away from the threaded spindle 11 to a pot holder 62. The pot holder 62 is open at one end and a closing pot 61 is inserted in this open end. In the upper half according to FIG. 6 the closing pot is, as a maximum, pushed on to an appropriate holed sleeve 43 with holes 49 as a further part of the actuating element 2. In the lower half according to FIG. 6 the closing pot 61 is pulled off the holed sleeve 43 as far as possible so that all the holes 49 let fluid pass according to the fluid flow 50.

In order to prevent rotation of the pot holder 62 relative to the device housing 42 a keyed shaft 47 is arranged between them analogous to FIG. 1.

It should be pointed out that with FIG. 6 also the same position sensor 32 as with FIG. 1 is used. This applies analogously also to the corresponding code carrier 33 and its arrangement within the drive device or its mounting on the threaded spindle 11.

With regard to FIG. 6 is should be noted that here in particular the oblique roller bearings 63 of the connecting sleeve 15 have reference symbols which are however also used analogously with the other embodiments.

Furthermore, it should be noted that the device housing 42, as also with the other embodiments, is of modular construction and with the steps on the outer surface, in particular with embodiments 4 and 6, is used for the automatic insertion of the corresponding drive device 1 with the actuating element 2 in a so-called tree in the mining of mineral oil and natural gas. The arrangement is simplified by the various steps and diagonal surfaces on the outside of the device housing 42 so that insertion can also occur using a remotely controlled robot or similar equipment.

Figure 7:
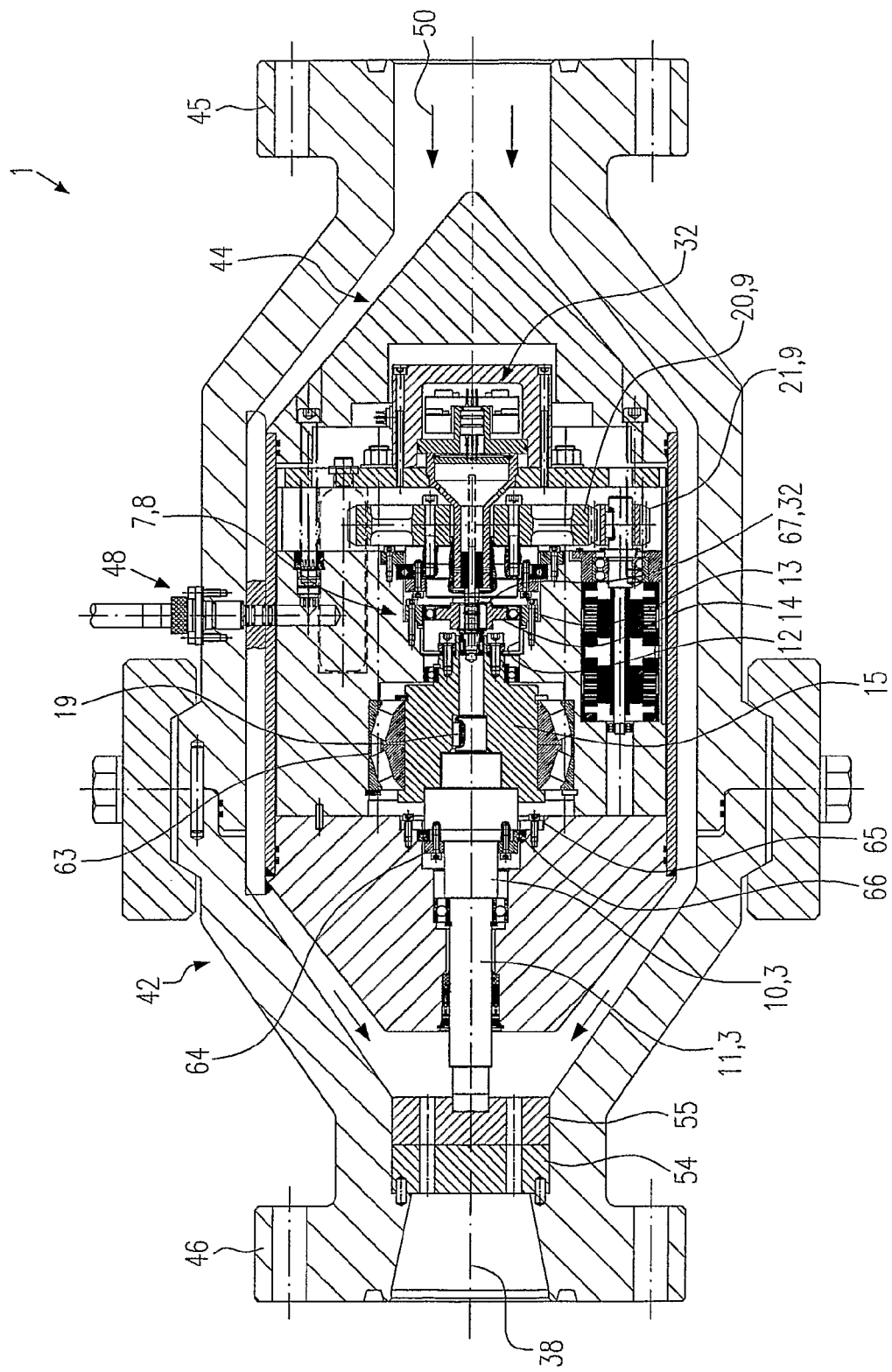

With the last embodiment according to FIG. 7 the arrangement of the corresponding parts of the drive device 1 in turn corresponds to that in FIG. 1, refer particularly to the arrangement of the connecting sleeve 15 of the gear unit 6 and the motors 4, 5. Also with FIG. 7 a circulation body 44 is used about which the fluid flows according to the fluid flow 50 from the inlet end 45 in the direction of the outlet end 46. In contrast to the embodiment according to FIG. 1, another type of throttle element is used which is formed from two perforated screens 54, 55, refer here also to FIG. 4. The first perforated screen 55 is supported rotationally and the second perforated screen 54 is supported rotationally rigidly inside the device housing 42. The rotation of the first perforated screen 55 is transferred directly by rotation of the threaded spindle 11 of the spindle drive 3. The threaded spindle 11 is employed analogously to the embodiment according to FIG. 4 in an appropriate retention hole 17 of the connecting sleeve 15 and is rotationally rigidly and axially immovably held there by splines 19.

In contrast to the previous embodiments, with the embodiment according to FIG. 7 no displacement of a part of the spindle drive 3 occurs in the axial direction, because the spindle nut 10 can also rotate, but is supported immovably in the axial direction within the circulation body 44. The corresponding support occurs by means of a bearing 66 arranged between two retention rings 64, 65.

The electrical supply of the corresponding units of the drive device 1 according to FIG. 7 occurs analogously to FIG. 1. One difference between the embodiments according to FIGS. 1 and 7 arises in the application of a different position sensor 32 which according to FIG. 7 is a torsion spring 67 as the relevant rotary position of the connecting sleeve 15 and is therefore the element detecting the threaded spindle 11. The corresponding torsion of the spring leads to different extended and compressed regions along the coil of the spring, which results in different resistance changes on electrical wires arranged in these regions. These resistance changes are converted into a corresponding torsion of the spring and hence into a corresponding rotated angle of the connecting sleeve 15, of the threaded spindle 11 and finally of the first perforated screen 55.

In the following the functioning principle of the drive device 1 according to the invention is explained based for example on FIG. 1.

On actuating the motors 4, 5 accordingly a rotation of the drive shaft 22 occurs and hence of the second spiral toothed gear wheel 23 of the helical spur gear 9. The rotation of the second spiral toothed gear wheel 23 is transferred by engagement of the helical teeth to the first spiral toothed gear wheel 20.

Through the helically toothed spur gear self-locking or self-braking is provided as well as a high efficiency with low dissipation losses. The corresponding tooth faces of the teeth 24 of the first and of each of the second spiral toothed gear wheels are in linear contact. Due to the parallel arrangement of the corresponding spiral toothed gear wheels essentially no axial forces occur and overall a simple construction arises. Furthermore, such a gear has relatively low noise levels, is compact in construction and exhibits a long service life.

As already explained, several of the second spiral toothed gear wheels 23 can be arranged in the circumferential direction of the first spiral toothed gear wheel 20 with corresponding drive shafts 22 and motors 4, 5.

The rotation of the first spiral toothed gear wheel 20 is transferred to the harmonic drive where it is further reduced. A drive of the connecting sleeve 15 occurs by means of the flexible toothed sleeve 12 and depending on the embodiment rotation of the spindle nut 10 or of the threaded spindle 11 occurs through the connecting sleeve. Due to the rotation of the corresponding part of the spindle drive 3 formed as a recirculating roller spindle drive a displacement or rotation of the relevant actuating element 2 occurs, whereby in addition a further gear unit comprising the fixed sleeve and the rotating sleeve 30, 31 can be arranged between the spindle drive 3 and the actuating element 2.

The actuating elements of the various embodiments are formed differently and generally exhibit a suitable sliding rod and flow control elements connected to it, such as perforated screens 54, 55 or holed sleeves 43. It should however be noted that drive devices according to the invention can also be used for other devices such as throttles, i.e. for example also for valves, dosage feed devices or similar equipment.

The invention claimed is:
1. Drive device for the adjustment of an actuating element of a throttle, valve, connection device, or dosage feed device in the production of oil or gas, the drive device comprising:
 a circulation body including fluid flow therethrough;
 at least one motor disposed within the circulation body;

at least one spindle drive disposed within the circulation body and movably connected to the actuating element to adjust the fluid flow therethrough;

a gear unit disposed within the circulation body and arranged between the spindle drive and the at least one motor, the gear unit including:

a reduction gear connected to the spindle drive; and a spur gear including a first spur gear wheel directly connected to the reduction gear and a second spur gear wheel connected to the at least one motor; and wherein a helix angle of the tooth arrangement of the first and/or second spur gear wheel lies in the range from 65 degrees to 85 degrees.

2. Drive device according to claim 1, further including:

wherein the spindle drive includes a recirculating roller spindle drive or ball spindle drive with a spindle nut and threaded spindle; and wherein the spindle nut is supported rotationally rigidly, but axially movably in a device housing.

3. Drive device according to claim 1, further including:

wherein the spindle drive includes a recirculating roller spindle drive or ball spindle drive with a spindle nut and threaded spindle; and wherein the spindle nut or threaded spindle is rotationally rigidly connected to the reduction gear.

4. Drive device according to claim 1, wherein the reduction gear includes a harmonic drive gear including a flexible, cup-shaped toothed sleeve, a fixed ring element, and a wave generator, whereby the toothed sleeve partially engages the inner teeth of the ring element with its outer teeth and the wave generator is arranged inside the toothed sleeve.

5. Drive device according to claim 4, wherein the toothed sleeve is rotationally rigidly connected to the spindle nut or the threaded spindle.

6. Drive device according to claim 4, wherein a rotationally supported, but axially immovable connecting sleeve is arranged between the toothed sleeve and the spindle drive.

7. Drive device according to claim 6, wherein the threaded spindle is rotationally rigidly inserted with its drive end into a retention hole of the connecting sleeve.

8. Drive device according to claim 1, wherein the spur gear is helically toothed.

9. Drive device according to claim 1, wherein the spur gear is formed as a double helical gear.

10. Drive device according to claim 4, wherein the reduction gear and in particular its wave generator are movably connected to a first spiral toothed gear wheel and the motor to a second spiral toothed gear wheel of the spur gear.

11. Drive device according to claim 10, wherein the second spiral toothed gear wheel is arranged on a drive shaft of the motor.

12. Drive device according to claim 11, wherein two or more motors are assigned to the drive shaft.

13. Drive device according to claim 12, further including at least a second drive shaft with at least a second motor supported in parallel to the threaded spindle in the device housing.

14. Drive device according to claim 13, wherein a second spiral toothed gear wheel, which engages the first spiral toothed gear wheel, is arranged on each drive shaft.

15. Drive device according to claim 1, wherein the transmission ratio of the spur gear is between $i=25$ and $i<1$.

16. Drive device according to claim 10, wherein the first and second spiral toothed gear wheel exhibit 1 to 10.

17. Drive device according to claim 6, wherein the connecting sleeve is releasably connected at its end facing away from the spindle drive to the toothed sleeve.

18. Drive device according to claim 1, further including:

wherein the spindle drive includes a recirculating roller spindle drive or ball spindle drive with a spindle nut and threaded spindle; and wherein at least one engaging element protrudes essentially radially outwards from the threaded spindle or the spindle nut and engages slots of a fixed sleeve and a rotating sleeve, whereby a first slot extends in the axial direction and a second slot extends at an acute angle to the first slot.

19. Drive device according to claim 18, wherein the actuating element can be rotated together with the rotating sleeve.

20. Drive device according to claim 1, wherein a position sensor is assigned to a rotating part of the spindle drive.

21. Drive device according to claim 2, wherein a distance sleeve is arranged in a motor hole of the device housing on a side, facing away from a spiral toothed gear wheel, of the at least one motor.

22. Drive device according to claim 6, wherein the spindle nut and the connecting sleeve are releasably connected to one another.

23. Drive device according to claim 1, wherein the reduction gear assigned to the spindle drive is a harmonic drive gear.

24. Drive device according to claim 1, wherein the spur gear assigned to the motor is self-locking.

* * * * *